United States Patent
Charamisinau et al.

(10) Patent No.: US 10,474,524 B2
(45) Date of Patent: Nov. 12, 2019

(54) POINT CLOUD FILTER METHOD AND APPARATUS

(71) Applicant: Topcon Positioning Systems, Inc., Livermore, CA (US)

(72) Inventors: Ivan Charamisinau, Livermore, CA (US); Michael Burenkov, Brighton, MA (US); Dmitry Datko, Sunnyvale, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 15/988,393

(22) Filed: May 24, 2018

(65) Prior Publication Data

US 2019/0018730 A1    Jan. 17, 2019

Related U.S. Application Data

(60) Provisional application No. 62/531,516, filed on Jul. 12, 2017.

(51) Int. Cl.
| | |
|---|---|
| G06F 7/02 | (2006.01) |
| H03M 13/00 | (2006.01) |
| G06F 11/08 | (2006.01) |
| G06F 16/901 | (2019.01) |
| G01S 17/89 | (2006.01) |
| G06F 17/15 | (2006.01) |

(Continued)

(52) U.S. Cl.
CPC ............. G06F 11/08 (2013.01); G01S 17/89 (2013.01); G06F 16/9027 (2019.01); G06F 17/15 (2013.01); G06F 17/16 (2013.01); G06K 9/0063 (2013.01); G06T 17/00 (2013.01); G06T 2207/10028 (2013.01)

(58) Field of Classification Search
CPC ............. G06F 11/0772; G06F 11/0745; G06F 16/9027; G06F 11/08; G06F 17/16; G06F 17/15; G06F 2207/10028; G06F 16/2246; G06F 9/30025; G06F 17/11; G01M 17/013; G01P 21/02; G01P 3/489; G01P 3/00; G01P 21/00; A61B 5/14532; A61B 5/1486; G01N 27/3274; B60T 8/885; B60T 2270/416; B60T 17/18; B60T 17/22; B60T 8/171; B60T 8/172; B60T 2250/06; G01D 5/24452; G01D 5/145; G01S 17/89; G06T 17/00; G06T 9/001; G06T 2207/10028; G06K 9/0063
See application file for complete search history.

(56) References Cited

U.S. PATENT DOCUMENTS

| | | |
|---|---|---|
| 6,608,913 B1 | 8/2003 | Hinton et al. |
| 8,290,305 B2 | 10/2012 | Minear et al. |

(Continued)

OTHER PUBLICATIONS

Alexa et al., "Point Set Surfaces", Visualization, 2001, VIS '01 Proceedings, IEEE, pp. 21-537, XP031172865.

(Continued)

*Primary Examiner* — Guerrier Merant

(74) *Attorney, Agent, or Firm* — Chiesa Shahinian & Giantomasi PC

(57) ABSTRACT

A point cloud filter method and apparatus is provided for use in point cloud rendering from real-time point cloud data collection from a variety of sensor types is provided that delivers enhanced performance including reducing processing requirements, limiting local memory consumption and optimizing overall data visualization.

20 Claims, 8 Drawing Sheets

(51) Int. Cl.
*G06F 17/16* (2006.01)
*G06K 9/00* (2006.01)
*G06T 17/00* (2006.01)

(56) References Cited

U.S. PATENT DOCUMENTS

| | | |
|---|---|---|
| 2005/0043916 A1 | 2/2005 | Wu et al. |
| 2011/0115812 A1 | 5/2011 | Minear et al. |
| 2013/0235050 A1 | 9/2013 | Karras |
| 2017/0123066 A1 | 5/2017 | Coddington et al. |
| 2017/0148210 A1 | 5/2017 | Marder-Eppstein et al. |

OTHER PUBLICATIONS

Devore et al., "Processing Terrain Point Cloud Data", SIAM Journal on Imaging Sciences, 2013, vol. 6., pp. 1-31, XP002786009.
Leal Narvaez et al., "Point Cloud Denoising Using Robust Principal Component Analysis", GRAPP—Proceedings of the First International Conference on Computer Graphics Theory and Applications, 2006, pp. 1-8, XP002786117.
Schon et al., "Octree-based Indexing for 3D Pointclouds within an Oracle Spatial DBMS", Computers & Geosciences 2013, vol. 51, pp. 430-438, XP002786008.
Valdivia et al., "Normal Correction Towards Smoothing Point-Based Surfaces", 2013 XXVI Conference on Graphics, Patterns and Images, 2013, pp. 187-194, XP032524052.
Yi, "The D-FCM Partitioned D-BSP Tree for Massive Point Cloud Data Access and Rendering", ISPRS Journal of Photogrammetry and Remote Sensing, 2016, vol. 120, pp. 25-36, XP029743900.
Invitation to Pay Additional Fees, dated Nov. 7, 2018, in connection with International Patent Application No. PCT/US2018/041181.
Invitation to Pay Additional Fees, dated Nov. 7, 2018, in connection with International Patent Application No. PCT/US2018/041183.
International Search Report and Written Opinion dated Jan. 9, 2019, in connection with International Patent Application No. PCT/US2018/041181, 18 pgs.
International Search Report and Written Opinion dated Jan. 9, 2019, in connection with International Patent Application No. PCT/US2018/041183, 19 pgs.
Davoodi et al., "Succinct Representations of Binary Trees for Range Minimum Queries", International Computing and Combinatorics Conference, 2012, pp. 396-407.

POINT CLOUD FILTER METHOD AND APPARATUS

CROSS REFERENCE TO RELATED APPLICATION

This application claims the benefit of U.S. Provisional Application No. 62/531,516, filed Jul. 12, 2017, the disclosure of which is herein incorporated by reference in its entirety.

TECHNICAL FIELD

The present invention relates to point cloud processing, and, more particularly, to point cloud rendering and point cloud data filtering for real-time point cloud data collected from a variety of sensor types.

BACKGROUND

The use of three-dimensional (3D) sensing systems and 3D imaging data is commonly used for generating 3D images of a location for use in various applications. For example, such 3D images are commonly used for generating topographical maps or for surveillance of a location, and such sensing systems typically operate by capturing elevation data associated with the location.

An example of one well-known 3D imaging system that generates 3D point cloud data is a Light Detection and Ranging (LIDAR) system. Typically, such LIDAR systems use a high-energy laser, optical detector, and timing circuitry to determine the distance to a target. In such LIDAR systems, data is generated by recording multiple range echoes from a single pulse of laser light to generate a frame (also referred to as an image frame). Each frame of LIDAR data is comprised of a collection of points in three dimensions (i.e., a 3D point cloud) which correspond to multiple range echoes within a sensor aperture. These points may be organized into so-called "voxels" which represent values on a regular grid in a 3D space. Voxels used in 3D imaging are akin to pixels used in a two-dimensional (2D) imaging device context. These frames may be processed to reconstruct a 3D image of a location where each point in the 3D point cloud has an individual (x, y, z) value representing the actual surface within the 3D scene under investigation.

As will be appreciated, LIDAR sensors collect vast amounts of data with scan rates approaching one million measurements per second. As such, these 3D sensing systems make efficient storage, data processing, and data visualization challenging given the data set sizes collected.

Therefore, a need exists for a point cloud rendering and point cloud filtering technique for real-time point cloud data collection from a variety of sensor types that delivers enhanced performance including reducing processing requirements, limiting local memory consumption and optimizing overall data visualization.

BRIEF SUMMARY OF THE EMBODIMENTS

In accordance with various embodiments, a point cloud filter method and apparatus is provided for use in point cloud rendering from real-time point cloud data collection from a variety of sensor types is provided that delivers enhanced performance including reducing processing requirements, limiting local memory consumption and optimizing overall data visualization.

More particularly, in accordance with an embodiment, a point cloud filter is employed to smooth and/or resample collected point cloud data in order to smooth the associated point cloud thereby increasing precision while preserving the details and features from the original point cloud data set. In accordance with the embodiment, flat surfaces defined in the point cloud data set are detected and adjusts are made in individual point position (e.g., towards the associated surface) in order to reduce the overall noise level in the collected point cloud data.

In the event of a particular dense collected point cloud data set, in accordance with an embodiment, an estimation is made with respect to the overall feature amount in the point cloud data set and resampling is applied to areas to those particular areas requiring less feature definition (e.g., planar surface) in order to preserve the original density for areas with increased feature definitions. In the embodiment, at least three parameters are utilized in the removal of redundant data points: (i) Sigma ($\sigma$): defined as the size of the Gaussian filter aperture. All feature details smaller than Sigma will be treated as noise and removed. The larger the Sigma value the larger the smoothing and, illustratively, optimal Sigma ranges for the subject point cloud filter are in the range of 0.05-0.2 meters; (ii) feature preservation: for very large objects (i.e., larger than the specific Sigma value), sharp edges are detected and preserved from smoothing. This parameter defines the sensitivity of object detection. That is, for every point in the data set a level of confidence is calculated that indicates whether this point belongs to a flat surface. The feature preservation parameter therefore defines a minimal level of confidence required for data filtration. The overall feature preservation applied is governed by a specified feature parameter in the range of 1 to 1000 (where 1 means the entire data set is smoothed, and 1000 means no smoothing is applied whatsoever and everything in the point cloud data set is a feature). Illustratively, in accordance with an embodiment, optimal feature preservation values are in the range of 10 to 16; and (iii) caching type: this parameter dictates whether filtering caching will be applied or not which translates to the overall processing speed applied for feature detection in the point cloud filter. In accordance with the embodiments herein, two computational speeds are facilitated and defined as "precise" (and having superior feature detection) and "fast" (having a speed approximately 3-6 times faster than the precise speed embodiment for dense data sets and large values of a), respectively, wherein the fast speed embodiment applies filter caching and the precise speed embodiment does not.

In accordance with an embodiment, a point cloud data is set if received and redundancies are removed. A determination is made whether to apply filter caching or not, as detailed above, which provides for storing the point cloud data set in a filter cache if so desired. For every point $P_i$ in the point cloud, all points $P_j$ that belong to the a defined area A around point $P_i$ are found and to that set of points principal component analysis (PCA) is applied to identify a covariance matrix. Using the covariance matrix, one or more eigenvectors and their one or more corresponding eigenvalues are determined, and a Gaussian filtration for point $P_i$ is applied to find a position correction vector $F_i$. A one direction filtering is applied defined as perpendicular to the surface (and leaving in-plane point positions intact) to generate a new/revised position correction vector $G_i$. A determination is then made if all the point in area A represent a surface and if so, a surface detection is applied in advance of applying a correction factor (otherwise only the correction factor is applied in the event the all the points do not represent the surface) to define a filtered point cloud data set.

These and other advantages of the embodiments will be apparent to those of ordinary skill in the art by reference to the following detailed description and the accompanying drawings.

DETAILED DESCRIPTION

Figure 1:
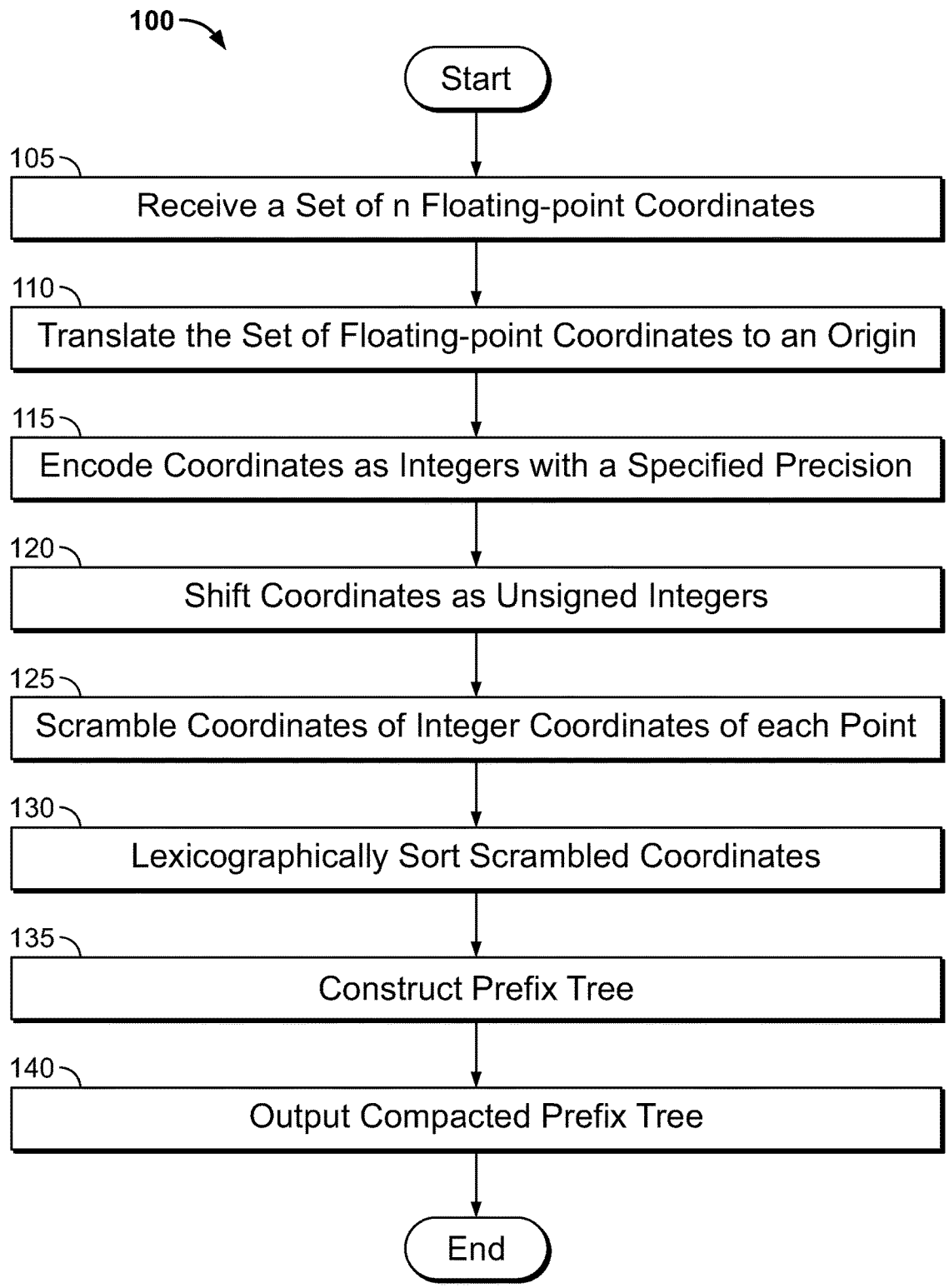
FIG. 1 shows a flowchart of illustrative operations for out-of-core rendering of large point cloud data sets in accordance with an embodiment.

In accordance with various embodiments, a point cloud filter method and apparatus is provided for use in point cloud rendering from real-time point cloud data collection from a variety of sensor types is provided that delivers enhanced performance including reducing processing requirements, limiting local memory consumption and optimizing overall data visualization.

Before describing the details of the point cloud filter, a representative point cloud data set and associated data structures will be described, the details of which are further described in co-pending U.S. patent application Ser. No. 15/988,380, which is hereby incorporated by reference in its entirety.

More particularly, in accordance with an embodiment, the processing of large 3D point cloud data collected from a variety of sensors (e.g., mobile mapping systems, terrestrial laser scanners, and unmanned aircraft systems, to name just a few) is facilitated using a particular tree traversing library. In the core of the library, in accordance with an embodiment is a succinct representation of full binary tree(s) and algorithm(s) for operating with the succinct representation for tree traversing and executing range queries on the binary tree. This representation allows for an efficient and generic way for assigning attributes of any type to inner and leaf nodes of full binary trees.

In conjunction with this full binary succinct representation, in accordance with an embodiment, a provably succinct representation and traversing algorithm is employed for arbitrary binary trees and generic storage for attributes assigned to inner and leaf nodes of binary trees. This provably succinct binary tree representation is utilized for building binary space partition trees and to apply spatial indexing, executing spatial queries, and applying nearest neighbor searches in point clouds.

As will be appreciated, succinct representations of binary trees are well-known. Existing representations allow for efficient pre-order or level-order tree traversal and provide a way to efficiently assign data attributes of the same type to tree nodes. However, known succinct implementations do not guarantee good locality of data and do not allow adding node attributes of arbitrary-type separately to inner nodes and leaves. By good locality, it is meant herein that accessing node data and traversing to nodes that are close in the tree requires access to bytes that reside close(er) in memory. On the other hand, the embodiments herein are both succinct and allow fast random traversing and separate attributes for inner-nodes and leaves of the tree.

The embodiments herein exploit certain succinct binary tree representations described for compact data storage and out-of-core (i.e., without loading the whole data set into memory) data rendering and processing, and facilitates a way to store and access point cloud coordinates and attribute data in a generic way allowing for an enhanced and unified application programming interface (API) for various versions of data storage formats. This further allows for efficient arbitrary tree traversals (including pre-order, in-order, and/or post-order traversals), and for the efficient assigning of different types of data attributes to inner tree nodes and to tree leaves.

FIG. 1 shows a flowchart of illustrative operations 100 for out-of-core rendering of large point cloud data sets (e.g., LIDAR data sets) in accordance with an embodiment. At step 105, a set of n floating-point coordinates is received defined as:

$$\{[x_0^{float}, y_0^{float}, z_0^{float}] \ldots [x_n^{float}, y_n^{float}, z_n^{float}]\}.$$

At step 110, the received floating-point coordinates are received and translated to an origin given by:

$$[\bar{x}_j^{float}, \bar{y}_j^{float}, \bar{z}_j^{float}] = [x_j^{float}, y_j^{float}, z_j^{float}] - [x_0^{float}, y_0^{float}, z_0^{float}].$$

These coordinates are encoded, at step 115, as integers with a specified precision p (e.g., p=1000 for 1 millimeter precision or p=100 for 1 centimeter precision) as follows:

$$[x_j^{int}, y_j^{int}, z_j^{int}] = [\bar{x}_j^{float}, \bar{y}_j^{float}, \bar{z}_j^{float}] \times p$$

Next, at step 120, there is an application of shift coordinates as unsigned integers given by:

$$[x_j^{uint}, y_j^{uint}, z_j^{uint}] = [x_j^{int}, y_j^{int}, z_j^{int}] + INT\_MAX/2$$

and m bits of (x, y, z) unsigned integer coordinates of each point are scrambled, at step 125, as follows:

$$\left\{ \begin{array}{l} [x_0 \cdots x_m] \\ [y_0 \cdots y_m] \\ [z_0 \cdots z_m] \end{array} \right\} \Rightarrow \{[x_0, y_0, z_0] \cdots [x_m, y_m, z_m]\}.$$

At step 130, the scrambled coordinates are lexicographically sorted as unsigned integers employing any number of conventional sorting algorithms to construct and output the constructed prefix tree, at steps 135 and 140, respectively. The constructed prefix tree is a binary space partitioning (BSP) tree constructed using well-known Morton encoding in which tree nodes represent hyper-rectangular regions of space and tree branches represent hyper-planar partitions of these hyper-rectangles into halves. In this way, the constructed BSP prefix tree is one in which tree nodes represent hyper-rectangular regions of space and tree branches represent hyper-planar partitions of these hyper-rectangles into halves.

Figure 2:
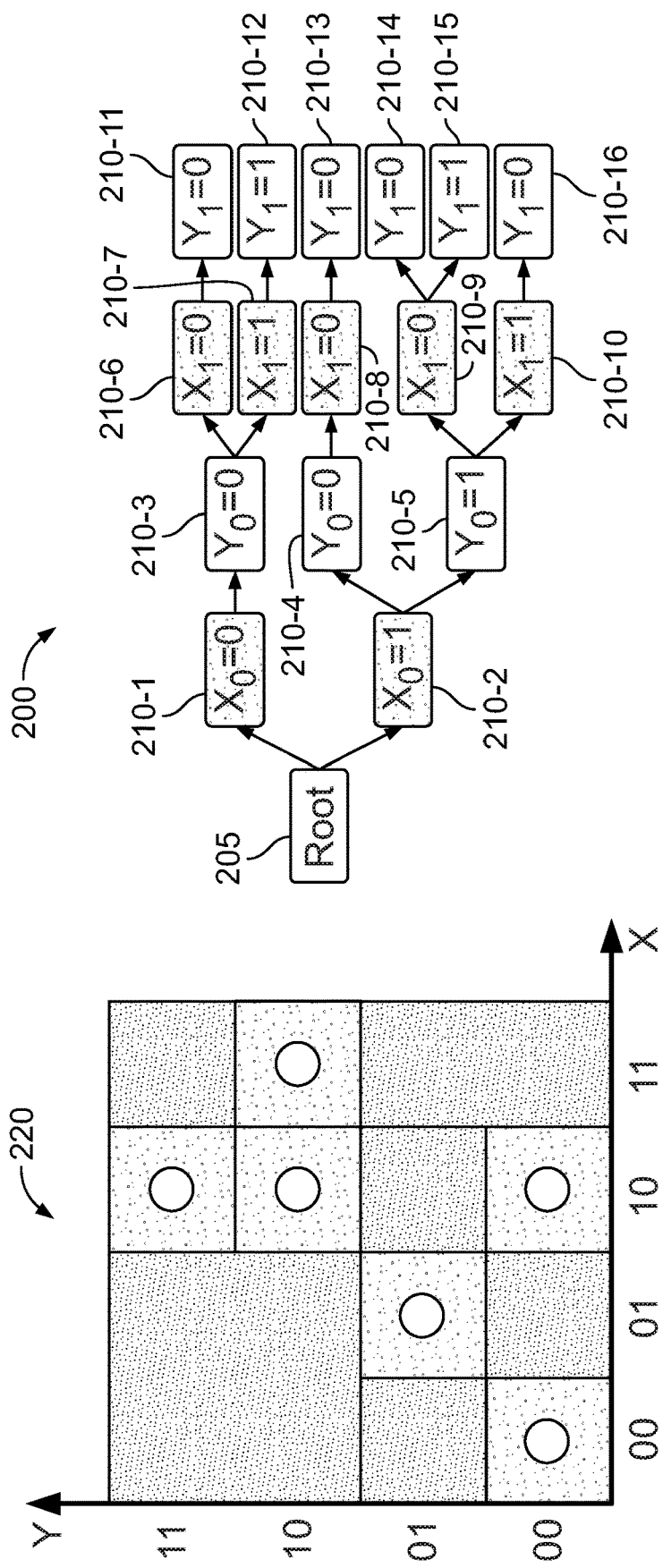
FIG. 2 shows an illustrative BSP tree constructed in accordance with an embodiment.
Figure 3:
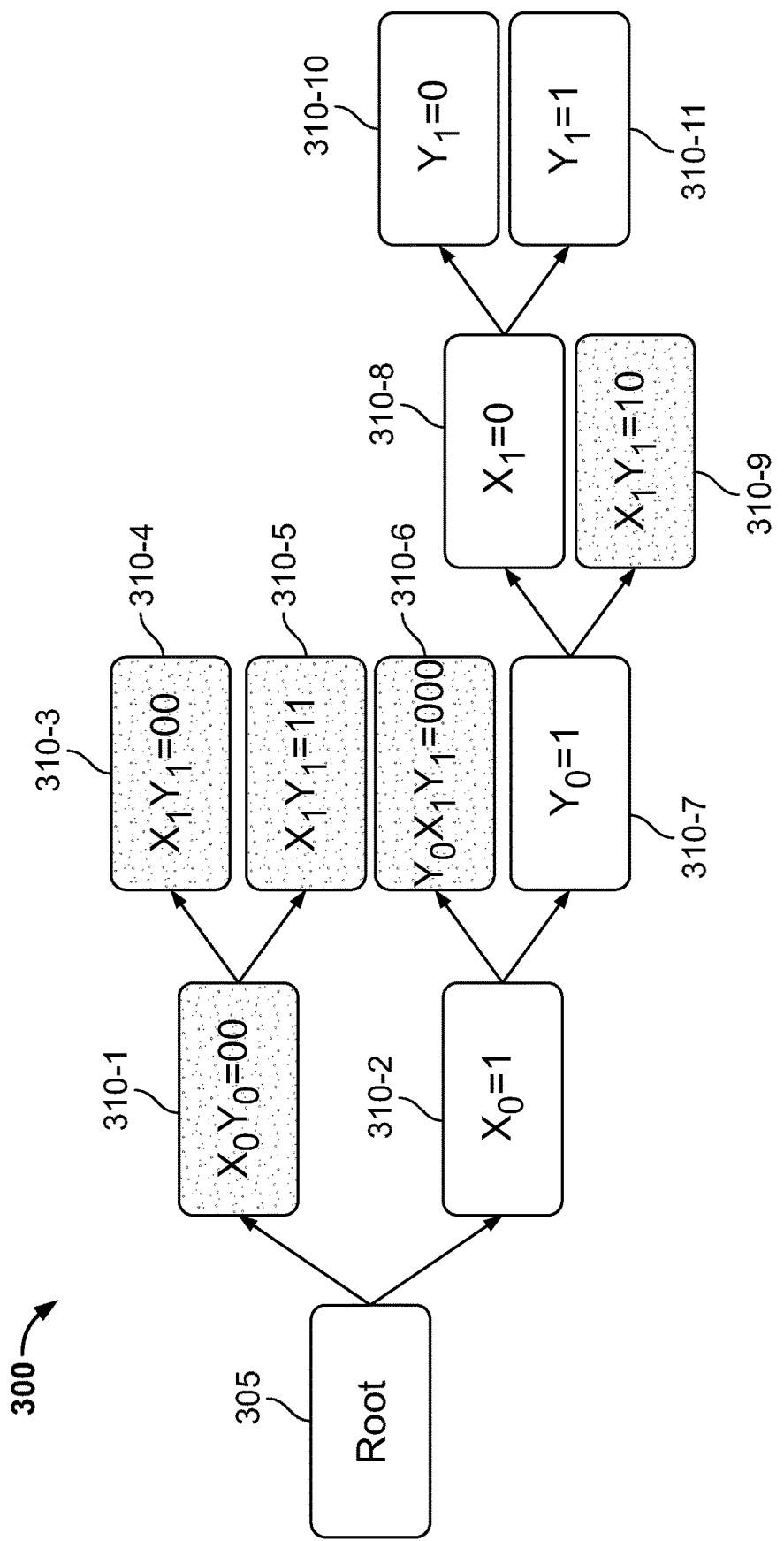
FIG. 3 shows an illustrative compacted prefix tree in accordance with the embodiment.

FIG. 2 shows an illustrative BSP tree 200 constructed in accordance with an embodiment and the aforementioned operations. As shown, BSP tree 200 is comprised of root node 205 and tree nodes 210-1 through 210-16. The portioning is shown in graph 220. For example, given a two-dimensional point cloud with 6 points (shown as circles) with a 4 by 4 bounding box, and where X and Y coordinates are given in binary code the process of building the tree (shown on the right hand side of FIG. 2) by dividing the bounding box in half along the X-axis (where $x_0$ represents the most significant bit of the X coordinate). Each half is then divided along the Y-axis where $y_0$ represents the most significant bit of the Y coordinate. Note that branch $x_0=0$, $y_0=1$ is not created because the bounding box for this branch is empty. The operations are then repeated for the second-significant bit in X and Y coordinate FIG. 3 shows an illustrative compacted prefix tree 300 in accordance with the embodiment. As shown, compacted prefix tree 300 comprises root node 305 and child nodes 310-1 through 310-11. Compacted prefix tree 300 has many useful properties, for example, these tree types have fewer nodes and are a fully binary tree which are required by the operations herein.

In accordance with an embodiment, compacted prefix tree 300 is employed to store large amounts of data (e.g., large numbers of nodes) and is traversed in order to retrieve and process assigned node attribute data, and execute any number of different queries, all completely out-of-core Illustratively, well-known techniques such as spatial indexing, spatial queries, viewing frustum, and nearest neighbor searching in point clouds are applied to compacted prefix tree 300. For example, view frustum culling is the process of removing objects that lie completely outside the viewing frustum from the rendering process. Rending such objects from the collected data set would waste precious processing cycles given that these objects are not directly visible. Typically, to speed up the culling, this is usually done using bounding volumes surrounding the objects rather than the objects themselves, as will now be discussed.

Figure 4:
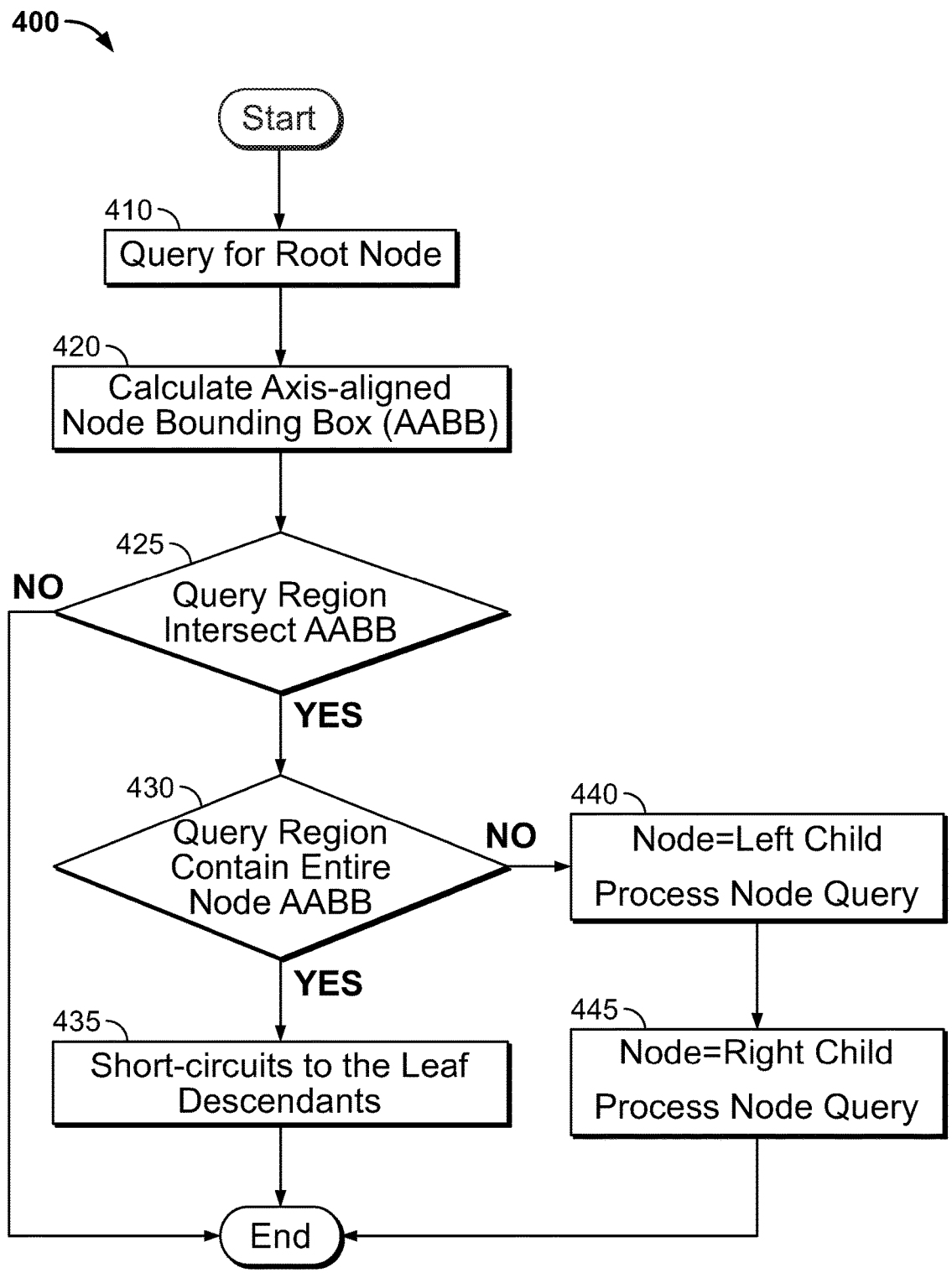
FIG. 4 shows a flowchart of illustrative operations for frustum culling using the compacted prefix tree of FIG. 3 in accordance with an embodiment.

FIG. 4 shows a flowchart of illustrative operations 400 for a spatial query (i.e., enumerate all points within given query region of space) using the prefix tree of FIG. 3 in accordance with an embodiment. In particular, every query starts, at step 410, as a query for the root node. At step 420, a prefix tree query is executed (and the axis-aligned node bounding box is calculated) in order to determine, at step 425, whether there is an intersection of the query region with the axis-aligned bounding box (AABB) of the root node (e.g., root node 305). If there is no intersection, the process is aborted. If there is an intersection then, at step 430, a determination is made if the query region completely contains the AABB. If so, the process short-circuits to the leaf descendants (i.e., directly enumerate all leaves under this node) at step 435. Otherwise, if the query region partially contains the AABB, as determined in step 430, there is a recursive processing of the node's children, if any, at steps 440 and 445 for the left and right children. Recursive processing of the node's children means that the process node query steps (i.e., steps 420-445) are executed for both the left child and right child of the current node. Of course, processing child nodes can invoke processing of grand-children nodes and so on. Eventually the process reaches a point where leaf nodes do not have children, and the bounding box is a point for them, such that partial intersection is impossible for them, so such node is either in or out.

Figure 5:
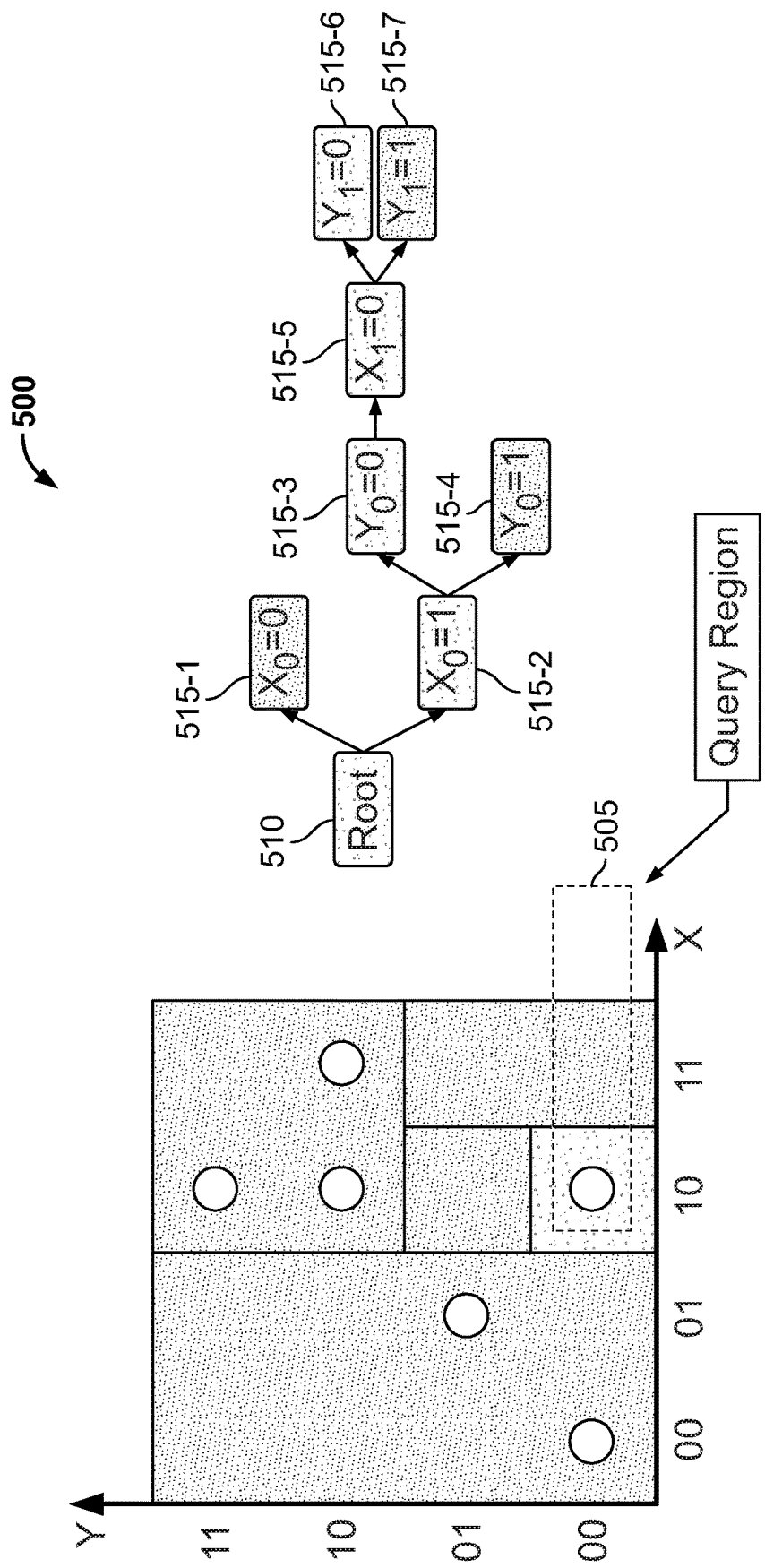
FIG. 5 shows illustrative results obtained in performing the operations set forth in FIG. 4.

For example, FIG. 5 shows illustrative results 500 obtained in performing the operations set forth in FIG. 4. As shown, query region 505 results in root node 510 having children nodes 515-1 through 515-7. Query region 505 partially intersects the bounding box of the full data set (i.e., AABB of root node), so the children are processed. Further, query region 505 does not intersect the AABB of the left child (i.e., $x_0=0$), so this node can be skipped, and query region 505 partially intersects the AABB of the right child ($x_0=1$), so these children nodes are processes. As shown, left child (i.e., $x_0=1$, $y_0=0$, $x_1=0$, $y_1=0$) is a leaf node which is within the query region, so this node is enumerated as a result of the query. Query region 505 does not intersect the AABB of the right child ($x_0=1$, $y_0=1$), so this node is skipped. Therefore, this illustrative query returns just one node (i.e., x=10, y=00).

Figure 6:
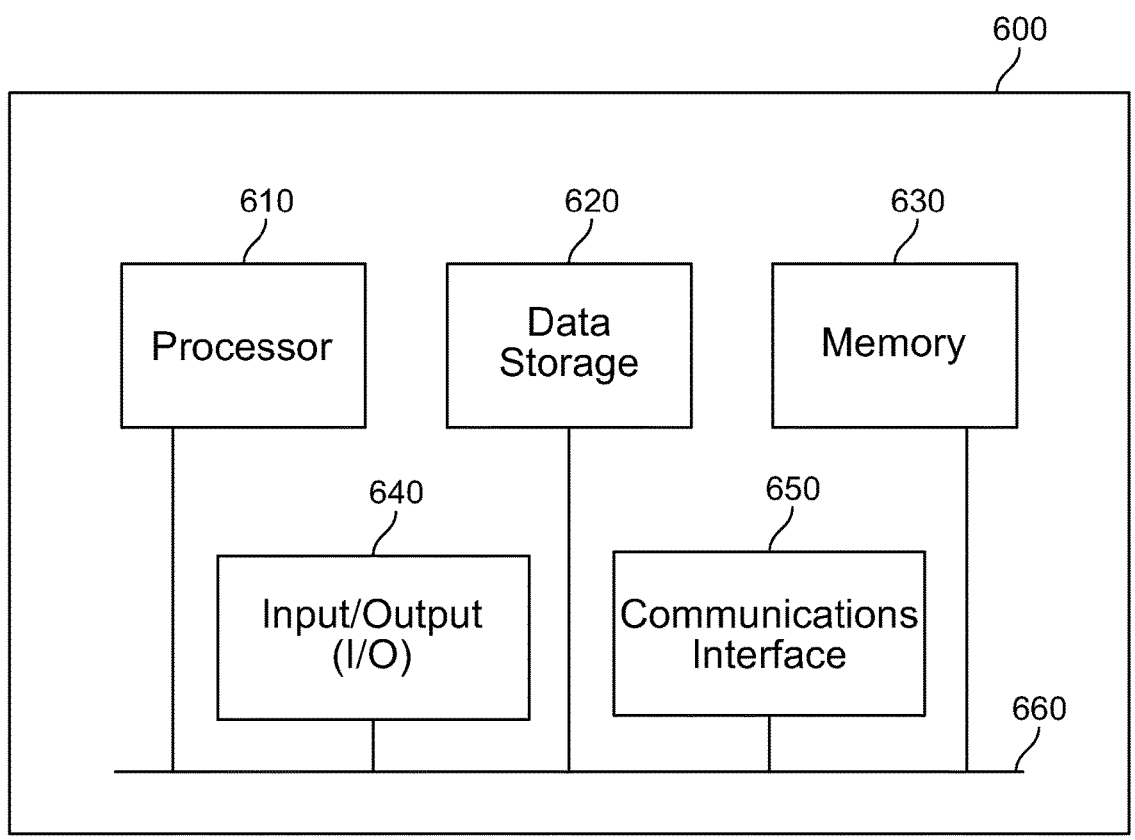
FIG. 6 is a high-level block diagram of an exemplary computer in accordance with an embodiment.

As detailed above, the various embodiments herein can be embodied in the form of methods and apparatuses for practicing those methods. The disclosed methods may be performed by a combination of hardware, software, firmware, middleware, and computer-readable medium (collectively "computer") installed in and/or communicatively connected to a user device. FIG. 6 is a high-level block diagram of an exemplary computer 600 that may be used for implementing point cloud rendering for real-time point cloud data collection from a variety of sensor types in accordance with the various embodiments herein. Computer 600 comprises a processor 610 operatively coupled to a data storage device 620 and a memory 630. Processor 610 controls the overall operation of computer 600 by executing computer program instructions that define such operations. Communications bus 660 facilitates the coupling and communication between the various components of computer 600. Of course, computer 600 may be any type of computing device such a computer, tablet, server, mobile device, smart phone, to name just a few. The computer program instructions may be stored in data storage device 620, or a non-transitory computer readable medium, and loaded into memory 630 when execution of the computer program instructions is desired.

Thus, the steps of the disclosed method (see, e.g., FIGS. 1 4, and 7) and the associated discussion herein above) can be defined by the computer program instructions stored in memory 630 and/or data storage device 620 and controlled by processor 610 executing the computer program instructions. For example, the computer program instructions can be implemented as computer executable code programmed by one skilled in the art to perform the illustrative operations defined by the disclosed method. Accordingly, by executing the computer program instructions, processor 610 executes an algorithm defined by the disclosed method. Computer 600 also includes one or more communication interfaces 650 for communicating with other devices via a network (e.g., a wireless communications network) or communications protocol (e.g., Bluetooth®). For example, such communication interfaces may be a receiver, transceiver or modem for exchanging wired or wireless communications in any number of well-known fashions. Computer 600 also includes one or more input/output devices 640 that enable user interaction with the user device (e.g., camera, display, keyboard, mouse, speakers, microphone, buttons, etc.).

Processor 610 may include both general and special purpose microprocessors, and may be the sole processor or one of multiple processors of computer 600. Processor 610 may comprise one or more central processing units (CPUs), for example. Processor 610, data storage device 620, and/or memory 630 may include, be supplemented by, or incorporated in, one or more application-specific integrated circuits (ASICs) and/or one or more field programmable gate arrays (FPGAs).

Data storage device 620 and memory 630 each comprise a tangible non-transitory computer readable storage medium. Data storage device 620, and memory 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 640 may include peripherals, such as a camera, printer, scanner, display screen, etc. For example, input/output devices 640 may include a display device such as a cathode ray tube (CRT), plasma or liquid crystal display (LCD) monitor for displaying information to the user, a keyboard, and a pointing device such as a mouse or a trackball by which the user can provide input to computer 600.

In accordance with various embodiments, a point cloud filter method and apparatus for use in point cloud rendering from real-time point cloud data collection (e.g., as detailed herein above) from a variety of sensor types is provided that delivers enhanced performance including reducing processing requirements, limiting local memory consumption, and optimizing overall data visualization.

More particularly, in accordance with an embodiment, a point cloud filter is employed to smooth and/or resample collected point cloud data (e.g., as detailed herein above) in order to smooth the associated point cloud thereby increasing precision while preserving the details and features from the original point cloud data set. In accordance with the embodiment, flat surfaces defined in the point cloud data set are detected and adjustments are made in individual point position (e.g., towards the associated surface) in order to reduce the overall noise level in the collected point cloud data.

In the event of a particular dense collected point cloud data set, in accordance with an embodiment, an estimation is made with respect to the overall feature amount in the point cloud data set and resampling is applied to those particular areas requiring less feature definition (e.g., planar surface) in order to preserve the original density for areas with increased feature definitions. In the embodiment, at least three parameters are utilized in the removal of redundant data points: (i) Sigma ($\sigma$): defined as the size of the Gaussian filter aperture. All feature details smaller than a will be treated as noise and removed. The larger the a value the larger the smoothing and, illustratively, optimal a ranges for the subject point cloud filter are in the range of 0.05-0.2 meters; (ii) feature preservation: for very large objects (i.e., larger than the specific a value), sharp edges are detected and preserved from smoothing. The overall feature preservation applied is governed by a specified feature parameter in the range of 1 to 1000 (where 1 means the entire data set is smoothed, and 1000 means no smoothing is applied whatsoever and everything in the point cloud data set is a feature). Illustratively, in accordance with an embodiment, optimal feature preservation values are in the range of 10 to 16; and (iii) caching type: this parameter dictates whether filtering caching will be applied or not which translates to the overall processing speed (i.e., either precise or fast) applied for feature detection in the point cloud filter. In accordance with the embodiments herein, two computational speeds are facilitated and defined as "precise" and "fast", respectively, wherein the precise speed applies certain filtering caching and the fast speed does not apply any such caching.

Figure 7:
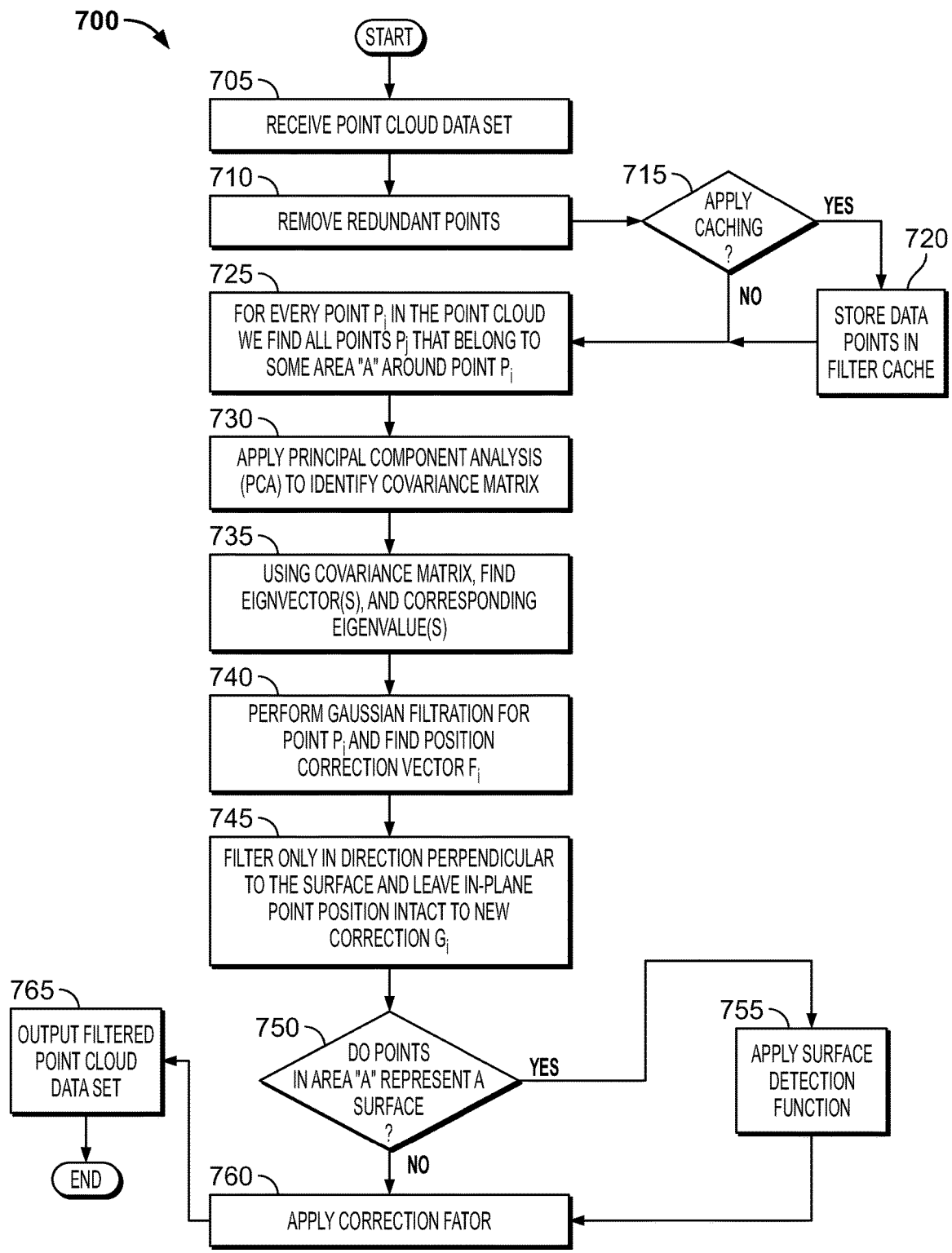
FIG. 7 shows a flowchart of illustrative operations for point cloud filtering in accordance with an embodiment.

FIG. 7 shows a flowchart of illustrative operations 700 for point cloud filtering in accordance with an embodiment. The operations encompass both of the aforementioned precise and fast embodiments which are differentiated, in part, by the application of the filter cache, as will be detailed below. At step 705, the point cloud data set is received and, at step 710, redundant points are removed. As detailed above, at least three parameters (i.e., a, feature preservation, and caching) are defined in order to facilitate the removal of redundant points, and these parameters may be, illustratively, user-defined or automatically assigned by the filtering system/processor. At step 715, a determination is made as to whether caching will be applied. In accordance with an embodiment, caching may be applied to accelerate the overall processing speed of the filtering operations (i.e., the fast speed embodiment) or not applied for more precision (i.e., the precision speed embodiment). If caching is to be applied, the data points are stored in a filter cache, at step 720, and are processed until the full point cloud data set is processed.

At step 725, the filtering operations continue such that for every point $P_i$ in the point cloud, all points $P_j$ that belong to some area (A) around point $P_i$ are processed. In particular, area A is defined as a $4\sigma*4\sigma*4\sigma$ cube in well-known earth-centered, earth-fixed (ECEF) coordinates. Next, at step 730, well-known principal component analysis (PCA) is applied to identify a covariance matrix S defined as:

$$S = \begin{bmatrix} S_{xx} & S_{xy} & S_{xz} \\ S_{xy} & S_{yy} & S_{yz} \\ S_{xz} & S_{yz} & S_{zz} \end{bmatrix} \text{ where:}$$

$$S_x = \frac{1}{N}\sum_{P_j \in A} P_{j,x}, \ S_y = \frac{1}{N}\sum_{P_j \in A} P_{j,y}, \ S_z = \frac{1}{N}\sum_{P_j \in A} P_{j,z}$$

$$S_{xx} = -S_x^2 + \frac{1}{N}\sum_{P_j \in A} P_{j,x}^2,$$

$$S_{yy} = -S_y^2 + \frac{1}{N}\sum_{P_j \in A} P_{j,y}^2, \ S_{zz} = -S_y^2 + \frac{1}{N}\sum_{P_j \in A} P_{j,z}^2$$

$$S_{xy} = -S_x S_y + \frac{1}{N}\sum_{P_j \in A} P_{j,x} P_{j,y},$$

$$S_{xz} = -S_y S_z + \sum_{P_j \in A} P_{j,x} P_{j,z}, \ S_{yz} = -S_y S_z + \sum_{P_j \in A} P_{j,y} P_{j,z}$$

and $P_{j,x}, P_{j,x}, P_{j,z}$, are $x, y, z$ coordinates of $P_j$.

Figure 8:
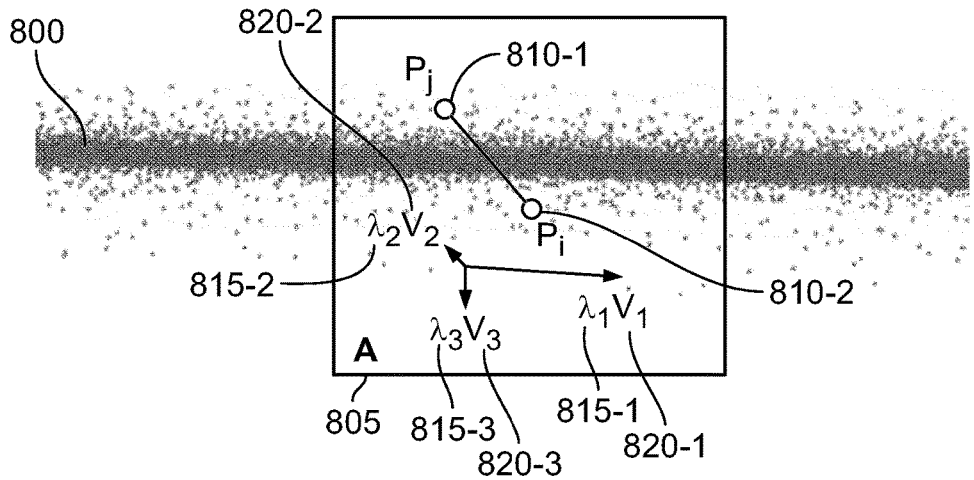
FIG. 8 shows an illustrative point cloud filtered in accordance with the operation of FIG. 7 in accordance with an embodiment.

At step 735, using the covariance matrix S, eigenvalues $\lambda_1, \lambda_2, \lambda_3$ ($\lambda_1 > \lambda_2 > \lambda_3$) and corresponding eigenvectors $v_1, v_2, v_3$ are determined. For example, FIG. 8 shows an illustrative point cloud 800 filtered in accordance with an embodiment.

As shown, point cloud 800 is filtered, as detailed above, such that for every point $P_i$ in the point cloud, all points $P_j$ 810-1 that belong to area (A) 805 around point $P_i$ 810-2 are processed with eigenvalues 815-1, 815-2 and 815-3, and eigenvectors 820-1, 820-2 and 820-3, respectively. In this way, FIG. 8 illustrates a two-dimensional projection whereby $v_2$ is perpendicular to the other respective eigenvectors (i.e., $v_1$, and $v_3$) At step 740, Gaussian filtration (a well-known technique) for point $P_i$ 810-1 is performed in order to find position correction vector $F_i$ as follows:

$$F_i = \frac{\sum_{P_j \in A} P_i P_j w_{ij}}{\sum_j w_{ij}}, \text{ where } w_{ij} = \exp\left(\frac{P_i P_j \cdot P_i P_j}{2\sigma^2}\right)$$

At step 745, filtering is performed only in a direction perpendicular to the surface so that in-plane point position are left intact. So a new correction $G_i$ is found as follows:

$$G_i = (F_i \cdot v_3) v_3$$

At step 750, a determination is made as to whether the points in point cloud 800 in area A 805 represent a surface, and if so, at step 755, a surface detection function $f(\lambda_1, \lambda_2, \lambda_3)$ is applied such that: $0 \leq f(\lambda_1, \lambda_2, \lambda_3) \leq 1$, $f(\lambda_1, \lambda_2, \lambda_3)=1$ when points in area A 805 represent a surface, and $f(\lambda_1, \lambda_2, \lambda_3)=0$ when points in area A 805 do not represent surface. Illustratively, the surface detection function is given by:

$$f(\lambda_1, \lambda_2, \lambda_3) = 1 - (a\lambda_3/\lambda_2)^2 \text{ capped to } [0,1]$$

At step 760, a correction factor to $P_i$ is applied to the extent allowed by $f(\lambda_1, \lambda_2, \lambda_3)$ to determine a corrected point $P'_i$ as follows:

$$P'_i = P_i + f(\lambda_1, \lambda_2, \lambda_3) * G_i$$

At step 765, the filtered point cloud data set results are output.

In accordance with the embodiment set forth in FIG. 7, for every point $P_i$ in the point cloud this point's neighbors $P_j$ within $4\sigma*4\sigma*4\sigma$ cube are found. Points are processed through points $P_j$ (illustratively, the operations in FIG. 7 are conducted on a single pass through the collected data points of the point cloud) and a calculation of S and $F_i$ is made. The overall complexity of these operations is given by the formula: $O(N*M_{avg})$, where N is the total number of points in the point cloud, and $M_{avg}$ is the average number of points per query. Assuming the point cloud comprises mainly surfaces (e.g., terrain, buildings, etc.) with density given by: Density [points/m$^2$], then the overall complexity is $O(N*\text{Density}*\sigma^2)$. As such, processing may become slower with the square of the sigma parameter setting (i.e., for deep filtration). It will also be noted that this is just the complexity of filtration itself, and the complexity of the point cloud database random access is different ($O(N*\log N)$). As will be appreciated, the complexity of any filtration operation that uses a binary search tree (BST) cannot be less than the full enumeration of the BST which is ($O(N*\log N)$), where N is the total number of points in the point cloud, and log N is the average complexity of BST access. In this way, $O(N*\log N)$ represents the theoretical maximum for filtration speed.

As such, the complexity associated with the "precise" speed embodiment herein is equal to the complexity where calculating S and F is equal to $O(N*M_{avg})$, and $M_{avg}$ is the average number of points per query (at steps 825 and 835, as detailed above). For example, if the point cloud mainly comprises surfaces (e.g., terrain, buildings, etc.) with a "Density" given by points/m$^2$ and a total area A in m$^2$, then the overall complexity is $O(N*\text{Density}*\sigma^2) = O(N^2*\sigma^2/A)$. As such the complexity may become $O(N^2)$ if the density is increasing at a constant area and this is significantly slower that the theoretical maximum $O(N)*\log N$).

As noted above, processing speed may be varied, in accordance with an embodiment, by employing filter caching (i.e., fast speed) such that the filtering operations build several grids on top of the filter cache every time the cache is reloads. In this way, all the point calculations detailed above will use only these several grids such the overall complexity of the filtering operations does not depend upon the total number of points in the filter cache and the complexity approaches O(N). To reduce the filtration operational complexity and increase filtration speed for dense data sets the "fast" speed embodiment is used which processes points from the data set in batches. Each batch takes points that fall into the box and builds three (3) different grids on top of box (i.e., initial box plus 20 from all sides). Then all per point calculations use only these grids so that overall complexity does not depend on the number of points in filter cache and thus is close to O(N).

Figure 9:
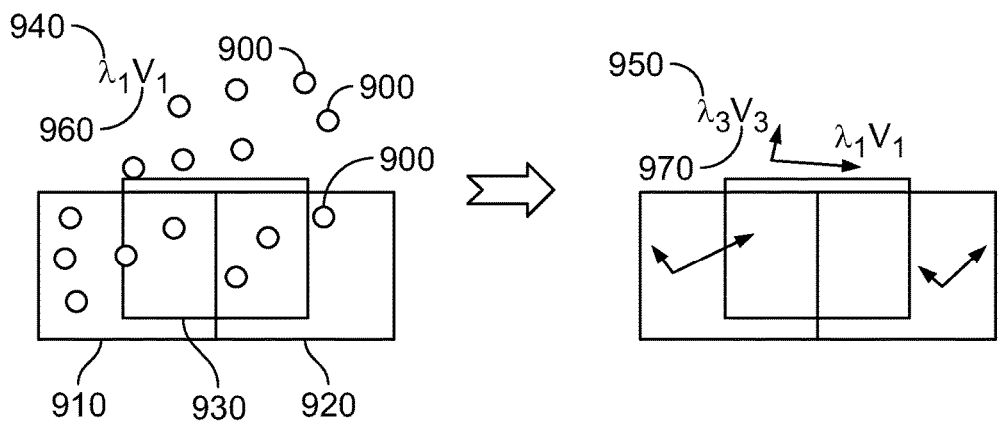
FIG. 9 shows an illustrative example of the principal component grids having overlapping boxes for a point cloud in accordance with an embodiment.

In the fast speed embodiment the 3 grids are defined as: big, small, and Gauss. Big and small grids are used to store principal component analysis, and the Gauss grid for Gauss filter calculations. Big and small grids have 9*9*9 cells, each cell represents a box of $4\sigma*4\sigma*4\sigma$ (i.e., big grid) or $2\sigma*2\sigma*2\sigma$ (i.e., small grid) centered around $(x_0+i*\sigma, y_0+j*\sigma, y_0+k*\sigma)$, where $(x_0, y_0, y_0)$ is a center of the filter cache, and i, j, k are integers ranging from –4 to +4. The boxes for grid cells are overlapping and when filter cache is loaded principal component analysis (i.e., calculate the S matrix, vectors and lambdas) is performed and with the storage of eigenvalues and eigenvectors separately for each cell(s) in these grids, with an illustrative example shown in FIG. 9. As shown, in FIG. 9 for point cloud 900 the three principal component grids have overlapping boxes (i.e., box 910, 920, and 930) with eigenvalues (i.e., eigenvalue 940 and 950) and eigenvectors (i.e., eigenvectors 960 and 970) stored from the principal component analysis.

Figure 10:
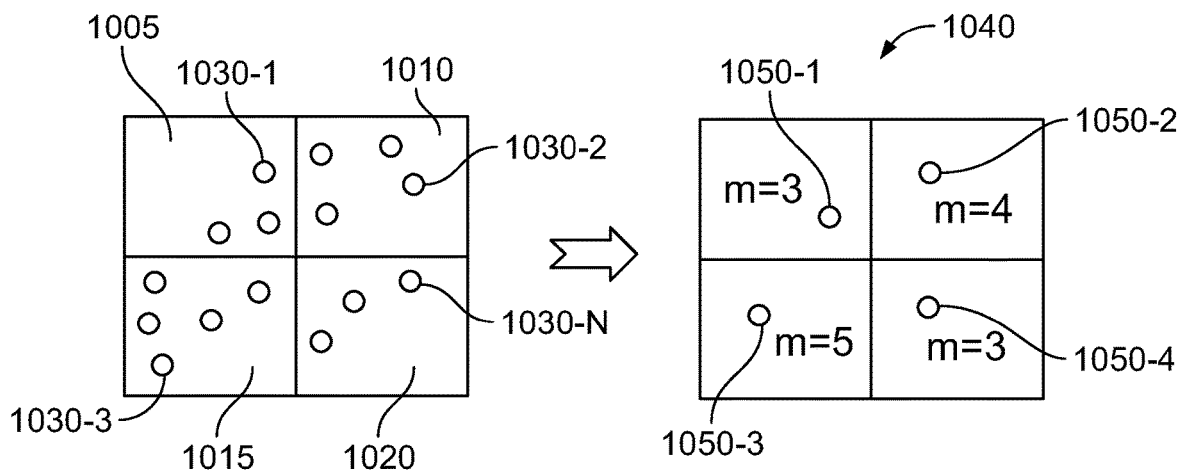
FIG. 10 shows an illustrative Gauss grid for a point cloud in accordance with an embodiment.

The Gauss grid has 24*24*24 cells, $$F_i = \frac{\sum_{P_j \in A} P_i P_j w_{ij}}{\sum_j w_{ij}}, \text{ where } w_{ij} = m \cdot \exp\left(\frac{P_i P_j \cdot P_i P_j}{2\sigma^2}\right)$$

each, no overlaps, and covers the whole $12\sigma*12\sigma*12\sigma$ of the filter cache. FIG. 10 shows an illustrative Gauss grid 1040 for a point cloud in accordance with an embodiment. Each cell (i.e., cell 1005, 1010, 1015, 1020) stores a number m of points of the point cloud (i.e., point 1030-1, 1030-2, 1030-3, 1030-N) that fall in this cell and their center mass (i.e., center mass 1050-1, 1050-2, 1050-3, and 1050-4), as shown in FIG. 10. Calculating the correction vector $F_i$, precedes as detailed above (see steps 735-740 in FIG. 7) but in this embodiment the centers of mass 1015-1, 1052-2, 1050-3, and 1050-4 from Gauss grid 10140 are utilized instead of actual points. As such, the Gaussian filter calculation always takes a number of steps defined by 7*7*7 regardless of the density and Sigma parameters. For example, the correction vector $F_i$ calculation is given by:

$$\frac{1}{2}\sigma * \frac{1}{2}\sigma * \frac{1}{2}\sigma$$

In instances where determining a surface detection function $f(\lambda_1, \lambda_2, \lambda_3)$ for filtration is desired, the smallest of the aforementioned stored values for the small and big grid are used. In special cases when too few points are available in the grid cell for reliable analysis the following is applied: if the small grid cell has less than twelve (12) points then $f(\lambda_1, \lambda_2, \lambda_3)$ from the big grid is used; or if the big grid cell has less than twenty (20) points then $f(\lambda_1, \lambda_2, \lambda_3)=0$, and no filtration occurs. As will be appreciated, the small grids help to detect smaller objects (e.g., objects that could be lost in the big grid if the rest of the surface is perfectly flat), and the big grids help with a big object with many points that can disturb a flat surface even from further away such that the small grid does not see the object at all. In accordance with the fast speed embodiment, the points in the input filter cache are enumerated one time to build the respective grids. A such, all grids are built for the full point cloud by enumerating around $(12*12*12/(8*8*8))*N=3.375*N$. Further, filtration also takes a fixed number of steps per point, and as mentioned above, O(N) defines the complexity of the filtration itself and the complexity of point cloud database random access is at least $O(N*\log N)$.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method comprising:
   receiving a point cloud data set, the point cloud data set comprising individual points $P_i$;
   removing redundancies in the point cloud data set;
   storing the point cloud data set in a filter cache;
   for every point $P_i$ in the point cloud data set, determining a plurality of points $P_j$ that belong to a defined area A around a respective one of the individual points $P_i$;
   determining a covariance matrix S using the plurality of points $P_j$;
   determining from the plurality of points $P_j$, using the covariance matrix S, one or more eigenvectors and one or more eigenvalues corresponding thereto;
   generating a position correction vector $F_i$ by applying a first filtering function using a Gaussian filtration for each point $P_i$;
   generating a revised position correction vector $G_i$ by applying a second filtering function, the second filtering function defined by a one direction filtering which is perpendicular to a surface represented by the point cloud data set;
   determining, using the revised position correction vector $G_i$, if all the individual points $P_i$ in the defined area A represent a surface and
   if so, applying a surface detection function followed by applying a correction factor to the individual points $P_i$ to generate a filtered point cloud data set; and
   otherwise, applying the correction factor to individual points $P_i$ to generate the filtered point cloud data set.

2. The method of claim 1 further comprising:
   outputting the filtered point cloud data set.

3. The method of claim 1 wherein the covariance matrix S is defined as:

$$S = \begin{bmatrix} S_{xx} & S_{xy} & S_{xz} \\ S_{xy} & S_{yy} & S_{yz} \\ S_{xz} & S_{yz} & S_{zz} \end{bmatrix} \text{ where:}$$

$$S_x = \frac{1}{N}\sum_{P_j \in A} P_{j,x},\ S_y = \frac{1}{N}\sum_{P_j \in A} P_{j,y},\ S_z = \frac{1}{N}\sum_{P_j \in A} P_{j,z}$$

$$S_{xx} = -S_x^2 + \frac{1}{N}\sum_{P_j \in A} P_{j,x}^2,$$

$$S_{yy} = -S_y^2 + \frac{1}{N}\sum_{P_j \in A} P_{j,y}^2,\ S_{zz} = -S_z^2 + \frac{1}{N}\sum_{P_j \in A} P_{j,z}^2$$

$$S_{xy} = -S_x S_y + \frac{1}{N}\sum_{P_j \in A} P_{j,x} P_{j,y},$$

$$S_{xz} = -S_x S_z + \sum_{P_j \in A} P_{j,x} P_{j,z},\ S_{yz} = -S_y S_z + \sum_{P_j \in A} P_{j,y} P_{j,z}$$

and $P_{j,x}$, $P_{j,x}$, $P_{j,z}$, are individual points having x,y,z coordinates of $P_j$.

4. The method of claim 1 wherein the defined area A is a $4\sigma*4\sigma*4\sigma$ cube in earth-centered, earth-fixed (ECEF) coordinates.

5. The method of claim 1 wherein the position correction vector $F_i$ is defined as:

$$(\text{Original})\ F_i = \frac{\sum_{P_j \in A} P_i P_j w_{ij}}{\sum_j w_{ij}},\ \text{where } w_{ij} = \exp\left(\frac{P_i P_j \cdot P_i P_j}{2\sigma^2}\right).$$

6. The method of claim 1 wherein the Gaussian filtration uses a Gaussian filter having a filter aperture size in a range of 0.05-0.2 meters.

7. The method of claim 1 wherein the point cloud data set is representative of a three-dimensional point cloud collected using a variety of sensors.

8. The method of claim 7 wherein the three-dimensional point cloud is generated in real-time using at least one compacted prefix tree.

9. The method claim 1 wherein storing the point cloud data set in a filter cache further comprises:
   separating the individual points $P_i$ of the point cloud data set into three principal component grids; and
   using the three principal component grids to process the individual points $P_i$ of the point cloud data set in batches from the filter cache.

10. The method claim 9 wherein one of the three principal component grids is a Gauss grid.

11. A method comprising;
   receiving a point cloud data set, the point cloud data set comprising individual points $P_i$;
   removing redundancies in the point cloud data set;
   storing the point cloud data set in a filter cache;
   for every point $P_i$ in the point cloud data set, determining a plurality of points $P_j$ that belong to a defined area A around a respective one of the individual points $P_i$;
   determining a covariance matrix S using the plurality of points $P_j$;
   determining from the plurality of points $P_j$, using the covariance matrix S, one or more eigenvectors and one or more eigenvalues corresponding thereto;
   generating a position correction vector $F_i$ by applying a first filtering function using a Gaussian filtration for each point $P_i$;
   generating a revised position correction vector $G_i$ by applying a second filtering function, the second filtering function defined by a one direction filtering which is perpendicular to a surface represented by the point cloud data set;
   determining, using the revised position correction vector $G_i$, if all the individual points $P_i$ in the defined area A represent a surface and
     if so, applying a surface detection function followed by applying a correction factor to the individual points $P_i$ to generate a filtered point cloud data set; and
     otherwise, applying the correction factor to individual points $P_i$ to generate the filtered point cloud data set.

12. The method of claim 11 further comprising:
   outputting the filtered point cloud data set.

13. The method of claim 11 wherein the covariance matrix S is defined as:

$$S = \begin{bmatrix} S_{xx} & S_{xy} & S_{xz} \\ S_{xy} & S_{yy} & S_{yz} \\ S_{xz} & S_{yz} & S_{zz} \end{bmatrix} \text{ where:}$$

$$S_x = \frac{1}{N} \sum_{P_j \in A} P_{j,x}, \; S_y = \frac{1}{N} \sum_{P_j \in A} P_{j,y}, \; S_z = \frac{1}{N} \sum_{P_j \in A} P_{j,z}$$

$$S_{xx} = -S_x^2 + \frac{1}{N} \sum_{P_j \in A} P_{j,x}^2,$$

$$S_{yy} = -S_y^2 + \frac{1}{N} \sum_{P_j \in A} P_{j,y}^2, \; S_{zz} = -S_y^2 + \frac{1}{N} \sum_{P_j \in A} P_{j,z}^2$$

$$S_{xy} = -S_x S_y + \frac{1}{N} \sum_{P_j \in A} P_{j,x} P_{j,y},$$

$$S_{xz} = -S_y S_z + \sum_{P_j \in A} P_{j,x} P_{j,z}, \; S_{yz} = -S_y S_z + \sum_{P_j \in A} P_{j,y} P_{j,z}$$

and $P_{j,x}$, $P_{j,x}$, $P_{j,z}$, are individual points having x,y,z coordinates of $P_j$.

14. The method of claim 11 wherein the defined area A is a 4σ*4σ*4σ cube in earth-centered, earth-fixed (ECEF) coordinates.

15. The method of claim 11 wherein the position correction vector $F_i$ is defined as:

$$F_i = \frac{\sum_{P_j \in A} P_i P_j w_{ij}}{\sum_j w_{ij}}, \text{ where } w_{ij} = \exp\left(\frac{P_i P_j \cdot P_i P_j}{2\sigma^2}\right).$$

16. The method of claim 11 wherein the Gaussian filtration uses a Gaussian filter having a filter aperture size in a range of 0.05-0.2 meters.

17. The method of claim 11 wherein the point cloud data set is representative of a three-dimensional point cloud collected using a variety of sensors.

18. The method of claim 17 wherein the three-dimensional point cloud is generated in real-time using at least one compacted prefix tree.

19. The method of claim 17 wherein the point cloud data set is generated from a Light Detection and Ranging (LIDAR) system.

20. The method of claim 19 wherein the point cloud data set represents at least one surface which is a terrain surface.

* * * * *

UNITED STATES PATENT AND TRADEMARK OFFICE
CERTIFICATE OF CORRECTION

PATENT NO. : 10,474,524 B2
APPLICATION NO. : 15/988393
DATED : November 12, 2019
INVENTOR(S) : Ivan Charamisinau, Michael Burenkov and Dmitry Datko Page 1 of 1

It is certified that error appears in the above-identified patent and that said Letters Patent is hereby corrected as shown below:

In the Specification

Column 10, Lines 40-46, " $F_i = \dfrac{\sum\limits_{P_j \in A} P_i P_j w_{ij}}{\sum\limits_j w_{ij}}$ , where $w_{ij} = m \cdot \exp\left(\dfrac{P_i P_j \bullet P_i P_j}{2\sigma^2}\right)$ " should read -- $\tfrac{1}{2}\sigma * \tfrac{1}{2}\sigma * \tfrac{1}{2}\sigma$ --;

Column 10, Lines 62-67, " $\tfrac{1}{2}\sigma * \tfrac{1}{2}\sigma * \tfrac{1}{2}\sigma$ " should read -- $F_i = \dfrac{\sum\limits_{P_j \in A} P_i P_j w_{ij}}{\sum\limits_j w_{ij}}$ , where $w_{ij} = m \cdot \exp\left(\dfrac{P_i P_j \bullet P_i P_j}{2\sigma^2}\right)$ --.

Signed and Sealed this
Twenty-fifth Day of February, 2020

Andrei Iancu
*Director of the United States Patent and Trademark Office*